US012249749B2

(12) United States Patent
Wang et al.

(10) Patent No.: US 12,249,749 B2
(45) Date of Patent: Mar. 11, 2025

(54) ENHANCED DIRECTIONAL COUPLERS FOR MASSIVE MIMO ANTENNA SYSTEMS

(71) Applicant: Outdoor Wireless Networks LLC, Claremont, NC (US)

(72) Inventors: Huan Wang, Richardson, TX (US); Jin Jiang, Shanghai (CN); Qiaozhi Chen, Shanghai (CN); XiaoHua Hou, Richardson, TX (US)

(73) Assignee: Outdoor Wireless Networks LLC, Claremont, NC (US)

( * ) Notice: Subject to any disclaimer, the term of this patent is extended or adjusted under 35 U.S.C. 154(b) by 290 days.

(21) Appl. No.: 18/157,045

(22) Filed: Jan. 19, 2023

(65) Prior Publication Data

US 2023/0238677 A1 Jul. 27, 2023

Related U.S. Application Data

(60) Provisional application No. 63/301,606, filed on Jan. 21, 2022.

(51) Int. Cl.
*H01P 5/18* (2006.01)

(52) U.S. Cl.
CPC .................................... *H01P 5/18* (2013.01)

(58) Field of Classification Search
CPC .. H01P 5/185; H01P 5/18; H01P 5/187; H01P 3/08; H01P 3/081; H01P 5/16;
(Continued)

(56) References Cited

U.S. PATENT DOCUMENTS 4,999,593 A * 3/1991 Anderson ............... H01P 5/185 333/112
2005/0258917 A1* 11/2005 Hubert .................... H01P 5/185 333/116
2017/0237140 A1* 8/2017 Dakhiya ............ H03F 3/45076 330/252

OTHER PUBLICATIONS

Caspers "RF engineering basic concepts: S-parameters" (Jan. 2012).
(Continued)

*Primary Examiner* — Lincoln D Donovan
*Assistant Examiner* — Tyler J Pereny
(74) *Attorney, Agent, or Firm* — Myers Bigel, P.A.

(57) ABSTRACT

A directional coupler includes a primary transmission line electrically coupled in series between an input port and an output port of the coupler, and an asymmetric, meander-shaped, secondary transmission line, which is electrically coupled in series between a coupling port and an isolation port of the coupler. The secondary transmission line includes a first coupling segment, which is reactively coupled to a first portion of the primary transmission line, and a second coupling segment, which is reactively coupled to a second portion of the primary transmission line, and is spaced closer to, or farther from, the primary transmission line relative to the first coupling segment, such that an asymmetry in reactive coupling is present between the first and second portions of the primary transmission line and the secondary transmission line. An intermediate segment is provided, which is electrically coupled in series between the first and second coupling segments. A coupling port segment is provided, which is electrically connected in series between the first coupling segment and the coupling port. And, an isolation port segment is provided, which is electrically connected in series between the second coupling segment and the isolation port.

18 Claims, 10 Drawing Sheets

(58) Field of Classification Search
CPC ...... H01P 5/184; H03F 1/42; H03F 2200/111; H03F 2200/129; H03F 2200/204; H03F 2200/207; H03F 2200/451; H03F 3/19; H03F 3/21; H03F 3/245; H03F 3/45076; H03F 3/45475; H03F 3/60
See application file for complete search history.

(56) References Cited

OTHER PUBLICATIONS

Li et al. "Design of Ultra-Wideband Directional Coupler Utilizing Continuous Zigzag Capacitive Compensation" Progress in Electromagnetics Research Letters 54:67-70 (2015).
Pelaez-Perez et al. "Ultra-Broadband Directional Couplers Using Microstrip With Dielectric Overlay in Millimeter-Wave Band" Progress In Electromagnetics Research 117:495-509 (2011).
Schutt-Aine "ECE 451 Coupled Lines" ECE Illinois (2020).
Zhu et al. "Broadband Microstrip Line Directional Coupler with High Directivity and Small Size" 2017 3rd IEEE International Conference on Computer and Communications (Dec. 2017).

* cited by examiner

ENHANCED DIRECTIONAL COUPLERS FOR MASSIVE MIMO ANTENNA SYSTEMS

REFERENCE TO PRIORITY APPLICATION

This application claims priority to U.S. Provisional Application Ser. No. 63/301,606, filed Jan. 21, 2022, the disclosure of which is hereby incorporated herein by reference.

FIELD

The present invention relates to cellular communications systems and, more particularly, to passive components of antenna systems.

BACKGROUND

Directional couplers are passive devices, which are used most frequently in radio and antenna systems to couple electromagnetic energy provided to an input port of a primary transmission line to a coupled port of a secondary transmission line, so that a portion of the coupled energy can be used by another circuit (e.g., calibration circuit) and/or device. In some applications, the coupled energy may be used as feedback so that a "sample" of a radio frequency (RF) signal provided to the input port may be used for monitoring and measurement, either alone or in combination with multiple samples from multiple RF signal feeds.

An essential characteristic of directional couplers is that they typically only couple energy being transferred in one direction, such that reverse energy/power entering the output port is coupled to an isolation port of the coupler (and terminated (e.g., 50Ω)), but not to the coupled port. In addition, directional couplers are most frequently constructed using two coupled transmission lines, primary and secondary, which are set sufficiently close together such that a portion of the RF energy passing through the primary transmission line is coupled to the secondary transmission line (and vice versa).

As will be understood by those skilled in the art, directional couplers may be used in massive MIMO antenna systems, where high isolation and flat coupling response throughout the operational band are important for, among other things, antenna calibration. One example of a directional coupler is illustrated by FIG. 1, which shows pair of homogeneously coupled lines. These lines include a primary transmission line extending between an input port (P1) and an output port (P2), and a secondary transmission line extending between a coupling port (P3) and an isolation port (P4), where: (i) Ze and Zo denote the even mode impedance and odd mode impedance, respectively, (ii) θ=θe=θo is the electrical length of the coupled portion of the primary and secondary transmission lines (for even and odd modes), and (iii) the coupling coefficient is defined by Equation (1) as:

$$C=(Ze-Zo)/(Ze+Zo) \tag{1}$$

Assuming a perfect impedance match condition (e.g., where reflection=0 at P1, P2, P3, and P4), the backward/reverse coupling factor is defined by Equation (2) as:

$$S_{31}=\frac{j\cdot C\cdot\tan\theta}{\sqrt{1-c^2}+j\cdot\tan\theta} \tag{2}$$

As demonstrated by Equation (2), the zeros of S31 are θ=k(π), where k=0, 1, 2 . . . ; and the maximums of $S_{31}$=C when θ=k(π)/2, as plotted in FIG. 2 (k=1 for a typical quarter-wave coupler).

Referring now to FIG. 3, a directional coupler is illustrated, which includes two coupled sections and one, central, uncoupled section. The network associated with the coupler consists of three 4×4 sub S-matrices: [Sp], [Sq], and [Sr]. The backward coupling rates of the two coupled sections are the elements of [Sp] and [Sr], where, as shown by Equations (3) and (4):

$$S_{p31}=S_{p42}=\frac{j\cdot C_p\cdot\tan\theta_p}{\sqrt{1-C_p^2}+j\cdot\tan\theta_p} \tag{3}$$

$$S_{r42}=S_{r31}=\frac{j\cdot C_r\cdot\tan\theta_r}{\sqrt{1-C_r^2}+j\cdot\tan\theta_r} \tag{4}$$

As shown by Equations (5)-(8), the total backward coupling rate of FIG. 3 is approximately derived as:

$$S_{31}=S_{p31}+S_{p21}{}^2S_{r42}S_{q21}S_{q34}, \tag{5}$$

where:

$$S_{q21}=e^{-j\theta_{q1}}, \tag{6}$$

$$S_{q34}=e^{-j\theta_{q2}}, \tag{7}$$

$$S_{p21}=\frac{\sqrt{1-C_p^2}}{\sqrt{1-C_p^2}\cos\theta_p+j\cdot\sin\theta_p} \tag{8}$$

As will be understood by those skilled in the art, both $\theta_{q1}$ and $\theta_{q2}$ in FIG. 3 can be of any length provided they are properly folded, as shown in FIG. 4 (where $\theta_{q2}$ is folded). Moreover, if the total length θ of the coupler of FIGS. 3-4 is treated as equal to the length θ of FIG. 1, (i.e., $\theta=\theta_p+\theta_{q1}+\theta_r$), and $\theta_p=\theta_r=0.358$, and the coupling coefficient Cp equals the coupling coefficient Cr, then the backward coupling rate S31 associated with the coupler of FIG. 4 is as shown in FIG. 5, which demonstrates that the total length θ can be reduced to well below π/2 (=90°), a quarter wavelength. As shown by FIG. 5, the first maximum of S31 appears at about θ=40° when $\theta_{q2}=1.58$, which indicates a significant length reduction.

Alternatively, if the total length θ of the coupler of FIGS. 3-4 is treated as equal to the length θ of FIG. 1, (i.e., $\theta=\theta_p+\theta_{q1}+\theta_r$), and $\theta_p=\theta_r=0.358$, but the coupling coefficient Cp is not equal the coupling coefficient Cr, then the backward coupling rate S31 is as shown in FIG. 6. In particular, FIG. 6 demonstrates that the illustrated coupling zero at about θ=120° (when Cp=Cr=0.2) can be eliminated by making the coupling coefficient Cr unequal to the coupling coefficient Cp, and thereby broadening the effective bandwidth of the coupler. Similar effects may also be achieved by making $\theta_p\neq\theta_r$ (not shown).

One theoretical advantage of the "ideal" homogeneously-coupled transmission lines of FIG. 1 is that θ=θe=θo, which provides for perfect isolation (i.e., $S_{32}=S_{41}=0\approx-\infty$ dB) regardless of the electrical length θ. However, with a conventional microstrip line coupler 10 having a nonhomogeneous configuration with different primary transmission line 10*a* and secondary transmission line 10*b* shapes, and different odd-mode and even-mode velocities ($V_{odd}$, $V_{even}$), such as shown by FIG. 7, the equivalency between θe and θo is typically not exact because: $\theta e=(2\pi f/V_{even})L$, and $\theta o=(2\pi f/V_{odd})L$, where f is frequency and L is physical length. This means $S_{32}=S_{41}\neq 0$ and the directivity of the coupler (i.e., the ratio between the input signal at the coupled port and the unwanted reflected signal at the coupled port) may become increasingly degraded with longer coupler lengths (L), as shown by the coupler and directivity graph of FIGS. 7-8, respectively. And, in the included table within FIG. 8, column X lists horizontal coordinates (i.e., frequency) of m1, m2, and m3 while column Y lists vertical coordinates (directivity) of m1, m2, and m3, for coupler lengths L=2.8 mm, 4.8 mm and 6.8 mm shown in FIG. 7. Thus, X1=X2=X3=3.6 (GHz) and Y1=12.285 (dB) for L=2.8 mm, Y2=8.3577 (dB) for L=4.8 mm, and Y3=7.0559 (dB) for L=6.8 mm. Because the coupler of FIG. 7 is symmetric about left and right, S32=S41 and S31=S42, and Y1=dB(S31)−dB(S32)=dB(S42)−dB(S41) at X1=3.6 GHz. The same applies for Y2 and Y3.

SUMMARY

A directional coupler for radio systems utilizes a high degree of coupling asymmetry to create constantly changing even-mode and odd-mode velocities, which can significantly improve coupler directivity (i.e., ratio between the input signal at the coupled port and the unwanted reflected signal at the coupled port), but without degrading the coupler's backward coupling rate. According to some embodiments of the invention, a directional coupler includes a primary transmission line, which is electrically coupled in series between an input port and an output port of the coupler, and an asymmetric, meander-shaped, secondary transmission line, which is electrically coupled in series between a coupling port and an isolation port of the coupler. This meander-shaped secondary transmission line includes a first coupling segment, which is reactively coupled to a first portion of the primary transmission line, and a second coupling segment, which is reactively coupled to a second portion of the primary transmission line. Advantageously, the second coupling segment is spaced closer to the primary transmission line relative to the first coupling segment, such that an asymmetry in reactive coupling is present between the first and second portions of the primary transmission line and the meander-shaped secondary transmission line. The meander-shaped secondary transmission line may also include an intermediate segment, which is electrically coupled in series between the first and second coupling segments, a coupling port segment, which is electrically connected in series between the first coupling segment and the coupling port, and an isolation port segment, which is electrically connected in series between the second coupling segment and the isolation port.

In addition, according to further aspects of these embodiments, a medial portion of the intermediate segment is spaced farther from the primary transmission line relative to the first and second coupling segments, and may be U-shaped or V-shaped, for example. The meander-shaped secondary transmission line may also include at least two serpentine-shaped transmission line segments electrically coupled in series between the coupling port and the isolation port.

According to further embodiments of the invention, the meander-shaped secondary transmission line includes at least three serpentine-shaped transmission line segments, which are electrically coupled in series between the coupling port and the isolation port. And, in these embodiments, the medial portions of the first, second and third serpentine line segments are spaced at different distances relative to the primary transmission line in order to create a high degree of coupling asymmetry.

According to additional embodiments of the invention, the meander-shaped secondary transmission line includes a first pair of equivalent serpentine-shaped transmission line segments, and a second pair of equivalent serpentine-shaped transmission line segments, which are longer than the first pair of equivalent serpentine-shaped transmission line segments. In some of these embodiments, one of the second pair of equivalent serpentine-shaped transmission line segments extends, in series, between the first pair of equivalent serpentine-shaped transmission line segments. In other embodiments, the second pair of equivalent serpentine-shaped transmission line segments extend, in series, between the first pair of equivalent serpentine-shaped transmission line segments.

In still further embodiments of the invention, the meander-shaped secondary transmission line includes: (i) a first pair of equivalent serpentine-shaped transmission line segments, (ii) a second pair of equivalent serpentine-shaped transmission line segments, which are longer than the first pair of equivalent serpentine-shaped transmission line segments, and (iii) a third pair of equivalent serpentine-shaped transmission line segments, which are longer than the second pair of equivalent serpentine-shaped transmission line segments. In some of these embodiments of the invention, one of the second pair of equivalent serpentine-shaped transmission line segments extends, in series, between the first pair of equivalent serpentine-shaped transmission line segments, and one of the third pair of equivalent serpentine-shaped transmission line segments extends, in series, between the first pair of equivalent serpentine-shaped transmission line segments. In alternative embodiments of the invention, the second pair of equivalent serpentine-shaped transmission line segments extend, in series, between the first pair of equivalent serpentine-shaped transmission line segments, whereas the third pair of equivalent serpentine-shaped transmission line segments extend, in series, between the second pair of equivalent serpentine-shaped transmission line segments.

According to additional embodiments of the invention, a directional coupler includes a primary transmission line, which is electrically coupled in series between an input port and an output port of the coupler, and a secondary transmission line, which is electrically coupled in series between a coupling port and an isolation port of the coupler. The secondary transmission line includes at least first, second and third serpentine-shaped transmission line segments, which are electrically connected in series. In these embodiments, the first, second and third serpentine-shaped transmission line segments have respective medial portions that are spaced at different distances relative to the primary transmission line. The first, second and third serpentine-shaped transmission line segments may also have equivalent dimensions when viewed from a plan perspective. In addition, the primary transmission line may have a medial segment that is sloped at an angle relative to the first, second and third serpentine-shaped transmission line segments, such that the medial portion of the first serpentine-shaped transmission line segment is spaced closer to the medial segment of the primary transmission line relative to the medial portion of the second serpentine-shaped transmission line segment, which is spaced closer to the medial segment of the primary transmission line relative to the medial portion of the third serpentine-shaped transmission line segment. The first serpentine-shaped transmission line segment may also extend in series between the coupling port and the second serpentine-shaped transmission line segment, and the third serpentine-shaped transmission line segment may extend in series between the second serpentine-shaped transmission line segment and the isolation port.

Moreover, in additional embodiments of the invention, the secondary transmission line of the directional coupler may include a first pair of equivalent, serpentine-shaped, transmission line segments, and a second pair of equivalent, serpentine-shaped, transmission line segments, which are longer than the serpentine-shaped transmission line segments within the first pair thereof. In these embodiments, a first one of the first pair of serpentine-shaped transmission line segments may extend in series between the coupling port and the second pair of serpentine-shaped transmission line segments, and a second one of the first pair of serpentine-shaped transmission line segments may extend in series between the isolation port and the second pair of serpentine-shaped transmission line segments. However, in other embodiments, a first one of the first pair of serpentine-shaped transmission line segments may extend in series between the coupling port and the second pair of serpentine-shaped transmission line segments, and a first one of the second pair of serpentine-shaped transmission line segments may extend in series between the isolation port and the first pair of serpentine-shaped transmission line segments.

DETAILED DESCRIPTION

Figure 1:
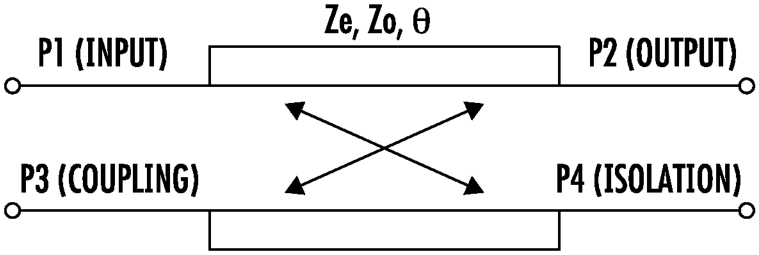
FIG. 1 (PRIOR ART)
FIG. 1 is schematic diagram of an ideal directional coupler, which includes a pair of homogenously coupled lines according to the prior art.
Figure 2:
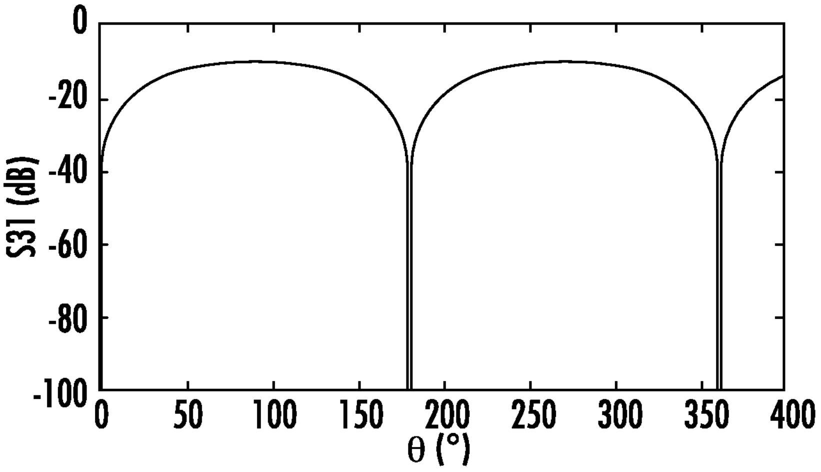
FIG. 2 (PRIOR ART)
FIG. 2 is graph of a backward coupling factor ($S_{31}$) versus electrical length (θ), for the ideal directional coupler of FIG. 1.
Figure 3:
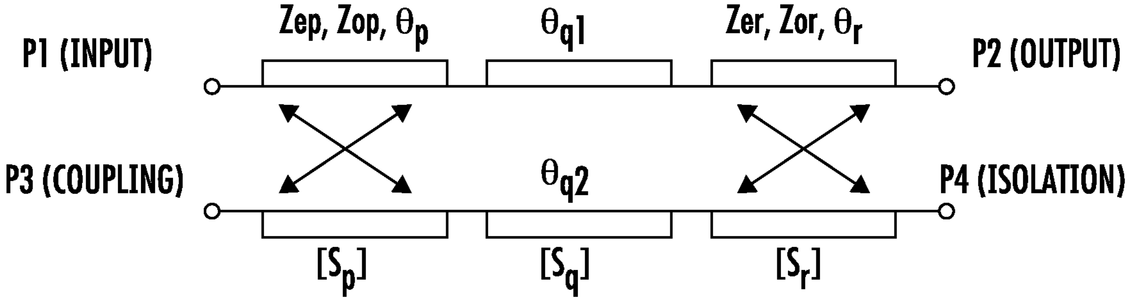
FIG. 3 (PRIOR ART)
FIG. 3 is schematic diagram of an ideal directional coupler, which includes two coupled sections separated by one uncoupled section, according to the prior art.
Figure 4:
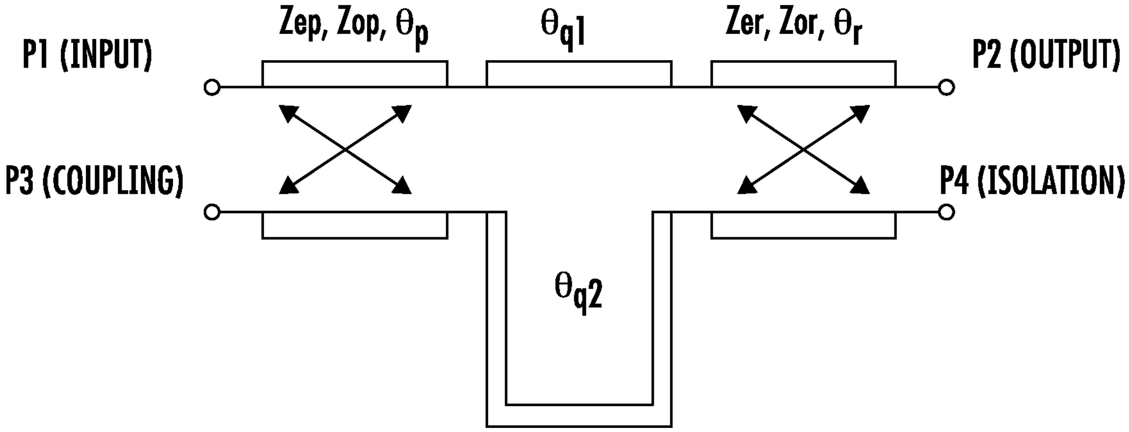
FIG. 4 (PRIOR ART)
FIG. 4 is schematic diagram of an ideal directional coupler containing two coupled sections, which are separated from each other by an uncoupled section having a folded line, according to the prior art.
Figure 5:
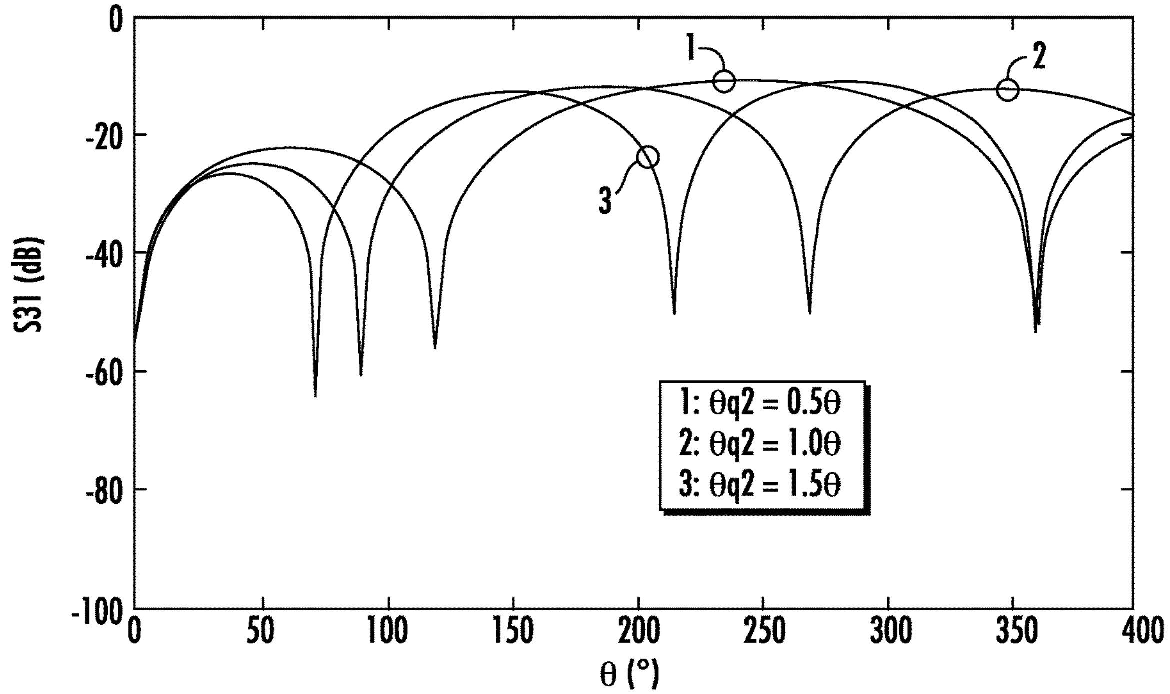
FIG. 5 (PRIOR ART)
FIG. 5 is graph of a backward coupling factor ($S_{31}$) versus electrical length (θ), for the ideal directional coupler of FIG. 4 (having coupled sections with equivalent coupling coefficients), at various lengths of the folded line within the uncoupled section, according to the prior art.
Figure 6:
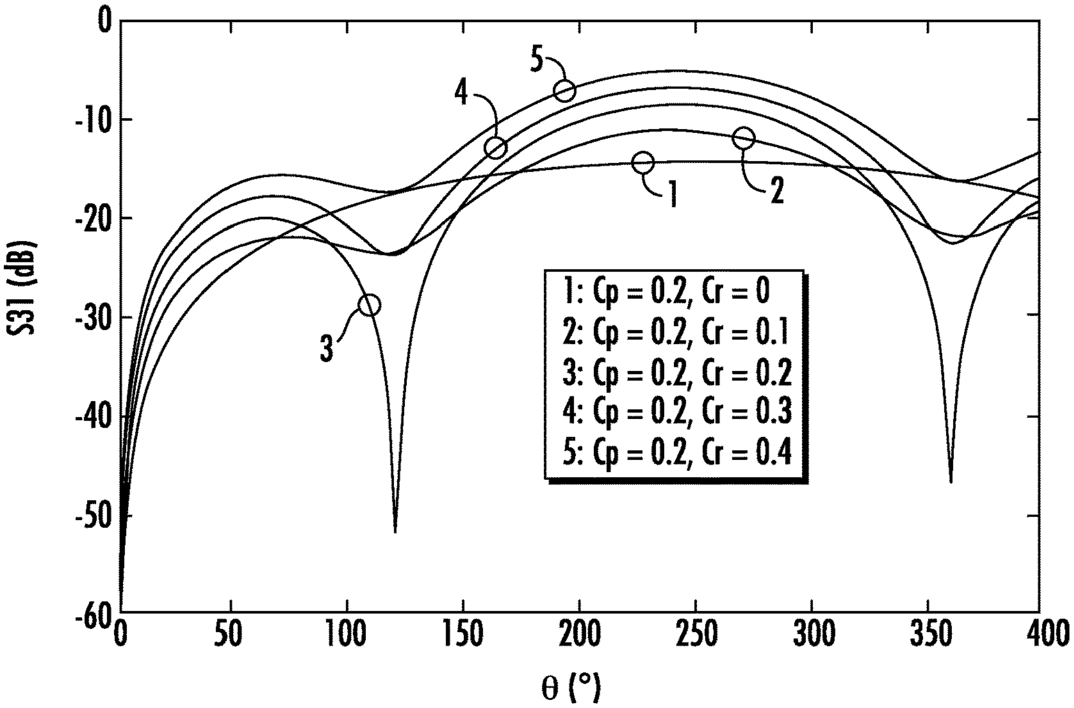
FIG. 6 (PRIOR ART)
FIG. 6 is graph of a backward coupling factor ($S_{31}$) versus electrical length (θ), for the ideal directional coupler of FIG. 4 (having coupled sections with unequal coupling coefficients), at various coupling coefficient ratios, according to the prior art.
Figure 7:
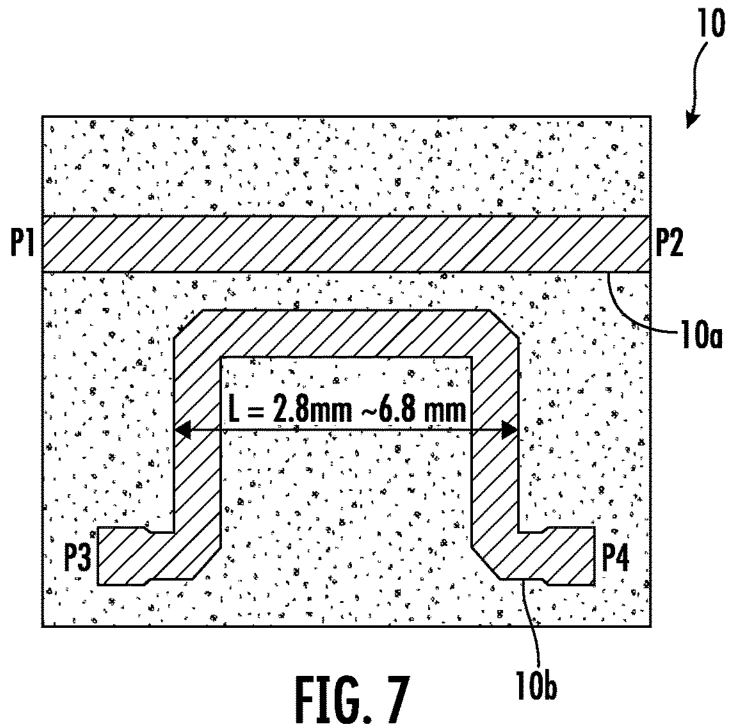
FIG. 7 (PRIOR ART)
FIG. 7 is a plan layout view a microstrip directional coupler with parallel-coupled lines, according to the prior art.
Figure 8:
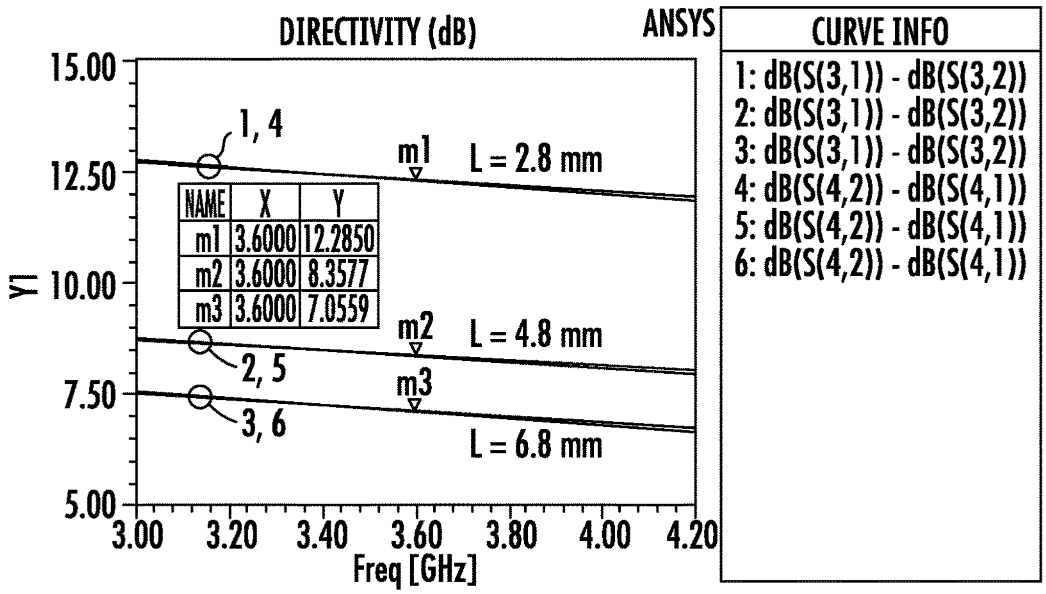
FIG. 8 (PRIOR ART)
FIG. 8 is a graph of directivity (dB) versus frequency (GHz) for the microstrip directional coupler of FIG. 7, at various coupling lengths (L) in a range from 2.8 mm to 6.8 mm, according to the prior art.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms “comprising”, “including”, “having” and variants thereof, when used in this specification, specify the presence of stated features, steps, operations, elements, and/or components, but do not preclude the presence or addition of one or more other features, steps, operations, elements, components, and/or groups thereof. In contrast, the term “consisting of” when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Moreover, as described herein, when port P1 serves as an input, then the coupler directivity is defined as S31/S32=S31 (dB)−S32(dB), the backward coupling rate equals S31, the isolation equals S32, and the forward coupling rate equals S41; however, when port P2 serves as an input, the coupler directivity is defined as S42/S41=S42 (dB)−S41 (dB), the backward coupling rate equals S42, the isolation equals S41, and the forward coupling rate equals S32. The backward coupling is typically the most meaningful, whereas the forward coupling can be absorbed by a loading resistor.

Referring now to FIGS. 9A-9D, a directional coupler 100 according to an embodiment of the invention is illustrated as including a primary transmission line 102*a*, which extends as a straight transmission line between an input port P1 and an output port P2 of the coupler 100, and a secondary transmission line 102*b*, which extends as an asymmetrically meander-shaped transmission line between a coupling port P3 and an isolation port P4 of the coupler 100. As shown, the secondary transmission line 102*b* includes: (i) a first coupling segment 104*a* that is spaced closely adjacent a first portion of the primary transmission line 102*a* by a first distance $d_1$, and (ii) a second coupling segment 104*b* that is spaced closely adjacent a second portion of the primary transmission line 102*a* by a second distance $d_2$. In this embodiment, $d_2<d_1$ such that a reactive coupling between the first coupling segment 104*a* and the first portion of the primary transmission line 102*a* is asymmetric relative to a reactive coupling between the second coupling segment 104*b* and the second portion of the primary transmission line 102*a*. In particular, because the second distance $d_2$ is less than the first distance $d_1$, a degree of reactive coupling between the second coupling segment 104*b* and the primary transmission line 102*a* is greater than a degree of reactive coupling between the first coupling segment 104*a* and the primary transmission line 102*a*.

Figure 9A:
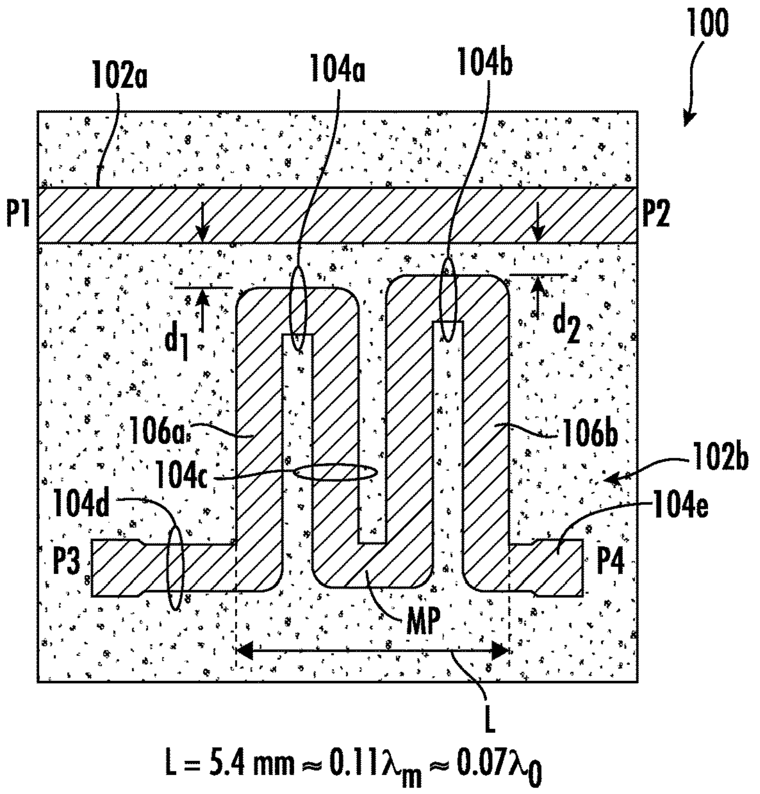
FIG. 9A is a plan layout view of a microstrip directional coupler including a primary transmission line and an asymmetric, meander-shaped, secondary transmission line, according to an embodiment of the invention.
Figure 9B:
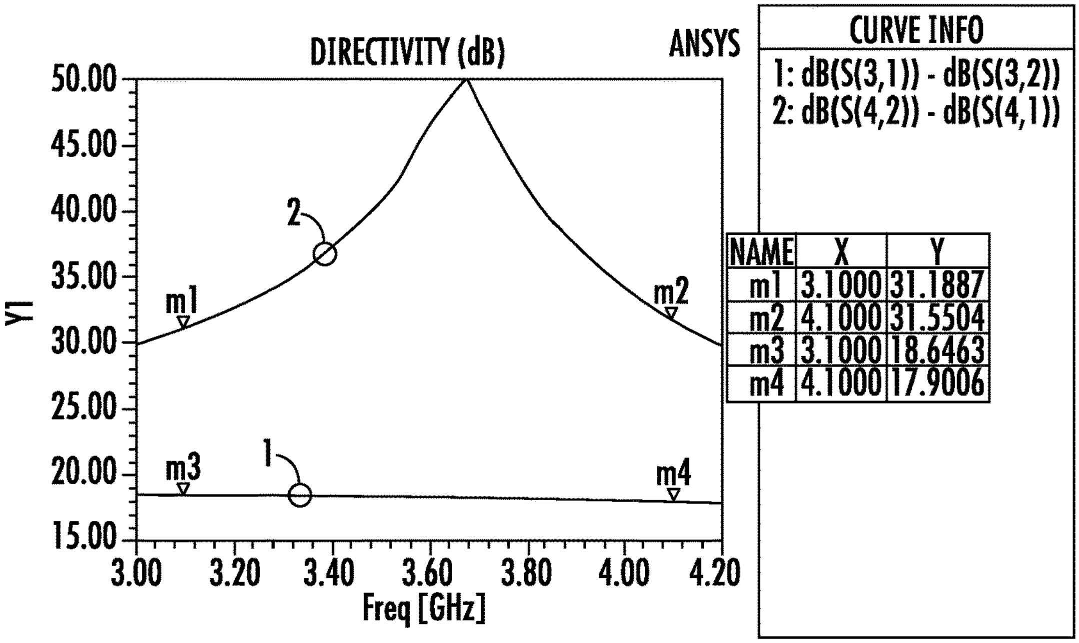
FIG. 9B is a graph of directivity (dB) versus frequency (GHz) for the microstrip directional coupler of FIG. 9A, when port P1 serves as the input port and when port P2 serves as the input port.

Advantageously, this coupling asymmetry between the first and second coupling segments 104*a*, 104*b* can produce constantly changing even-mode and odd-mode velocities during operation, and thereby improve coupler directivity as illustrated by FIG. 9B, which is a graph of directivity (dB) versus frequency (GHz) for the microstrip directional coupler of FIG. 9A. In FIG. 9B, the lower curve corresponds to the directivity from ports P1 to P3 when port P1 serves as the input port, whereas the upper curve corresponds to the directivity from ports P2 to P4 when port P2 serves as the input port. As shown by the graph and embedded table (X=frequency, Y=directivity at points m1, m2, m3 and m4), the lower curve is 10+ dB lower than the upper curve, which means the directivity when port P1 serves as an input port is 10+ dB lower than the directivity when port P2 serves as an input port. More specifically, when port P1 serves as an input port, the coupling rate=S31 and the directivity=S31/S32; but when port P2 servers as input port, the coupling rate=S42 and the directivity=S42/S41. And, because d1>d2 and dB(S42/S41)>dB(S31/S32), input port P2 results in the larger dB directivity, which is typically preferred.

Referring again to FIG. 9A, the secondary transmission line 102*b* also includes: an intermediate segment 104*c*, which is electrically coupled in series between the first and second coupling segments 104*a*, 104*b*, a coupling port segment 104*d*, which is electrically coupled in series between the first coupling segment 104*a* and the coupling port P3, and an isolation port segment 104*e*, which is electrically coupled in series between the second coupling segment 104*b* and the isolation port P4. As shown, the intermediate segment 104*c* is patterned as a U-shaped (or V-shaped) metal trace having a medial portion MP that is spaced farther from the primary transmission line 102*a* relative to the first and second coupling segments 104*a*, 104*b*; and, the coupling port and isolation port segments 104*d*, 104*e* are patterned as respective L-shaped metal traces. However, other shapes may be used for these U-shaped (or V-shaped) and L-shaped metal traces, which include both coupling segments and non-coupling segments, according to other embodiments of the invention.

Moreover, as described herein, the coupling port segment 104*d*, the first coupling segment 104*a* and a first half of the intermediate segment 104*c* collectively define a first serpentine-shaped transmission line segment 106*a*, whereas a second half of the intermediate segment 104*c*, the second coupling segment 104*b* and the isolation port segment 104*e* collectively form a second serpentine-shaped transmission line segment 106*b*. FIG. 9A also shows that L=5.4 mm, which corresponds to a distance from left edge of 106*a* to right edge of 106*b*. In addition, segments 104*d* and 104*e* are normally 50 Ω lines of varying length, but can also be used for impedance tuning with optimized width and length. Rogers RO4350/20 mil (Dk=3.66) can be used as a microstrip substrate. A 5.4 mm microstrip line is equivalent to 39.4° electrical length, where 5.4 mm and 39.4° are related by formula θ=2π*f*L/vp, where θ is electrical length, f is frequency, L is physical length, and vp is phase velocity in a microstrip line. A full wavelength of microstrip line is equivalent to 360° electrical length. Thus, a L=5.4 mm microstrip line is equivalent to 39.4°/360°=0.11 wavelength of microstrip line (i.e., λm at f=3.6 GHz, where λ0 is the wavelength in free space at f=3.6 GHz).

Figure 9C:
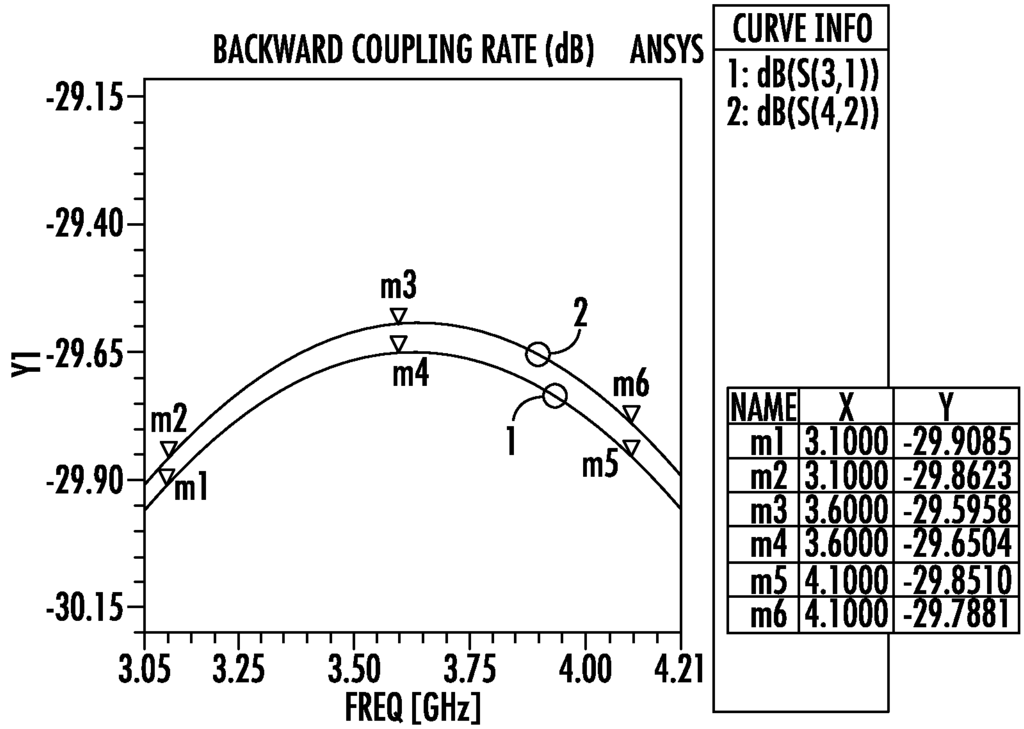
FIG. 9C is a graph of backward coupling rate (dB) versus frequency (GHz) for the microstrip directional coupler of FIG. 9A, when port P1 serves as the input port and when port P2 serves as the input port.
Figure 9D:
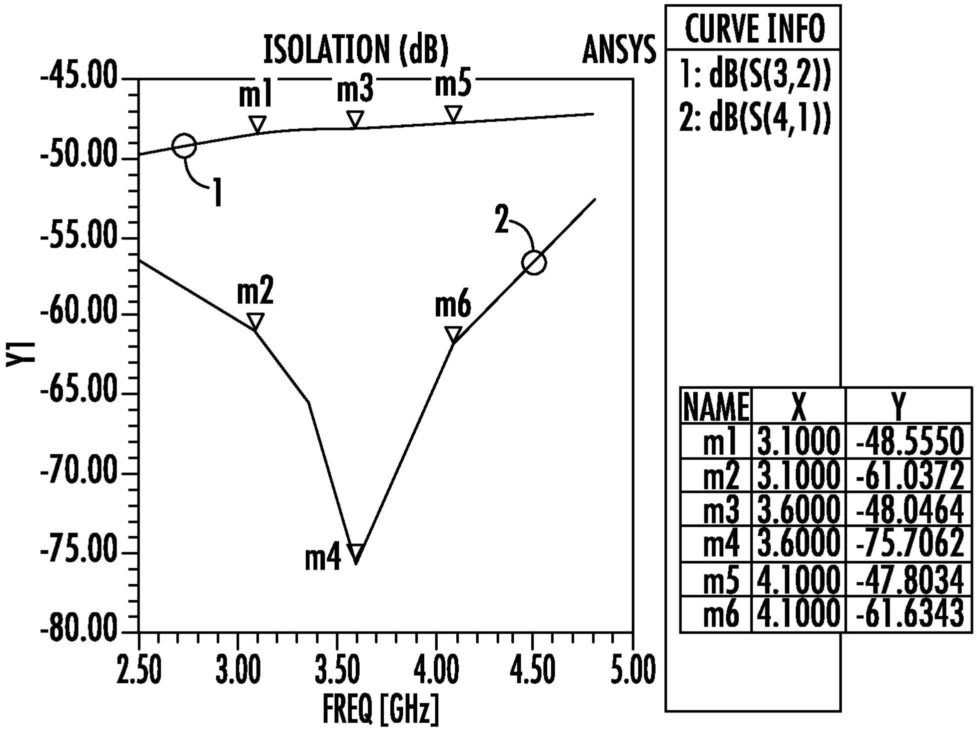
FIG. 9D is a graph of isolation (dB) versus frequency (GHz) for the microstrip directional coupler of FIG. 9A, when port P1 serves as the input port and when port P2 serves as the input port.

In FIG. 9C, a graph of backward coupling rate (dB) versus frequency (GHz) for the microstrip directional coupler of FIG. 9A is provided, and in FIG. 9D, a graph of isolation (dB) versus frequency (GHz) for the microstrip directional coupler of FIG. 9A is provided. In FIG. 9C, the lower curve (S(3,1)) corresponds to the backward coupling rate from ports P1 to P3 when port P1 serves as the input port, whereas the upper curve (S(4,2)) corresponds to the backward coupling rate from ports P2 to P4 when port P2 serves as the input port. And, in FIG. 9D, the upper curve corresponds to the isolation S(3,2) when port P1 serves as an input, and the lower curve corresponds to the isolation S(4,1) when port P2 serves as an input.

As shown by FIG. 9C, the value of S(3,1) at 3.1 GHz (m1)=−29.9085 dB, the value of S(3,1) at 3.6 GHz (m4)=−29.6504 dB, and the value of S(3,1) at 4.1 GHz (m5)=−

29.8510 dB, whereas the value of S(4,2) at 3.1 GHz (m2) =−29.8623 dB, the value of S(4,2) at 3.6 GHz (m3)=−29.5958 dB, and the value of S(4,2) at 4.1 GHz (m6)=−29.7881 dB. Thus, at 3.6 GHz, the difference in coupling is only 0.0546 dB. As shown by FIG. 9D, the value of S(3,2) at 3.1 GHz (m1)=−48.5550 dB, the value of S(3,2) at 3.6 GHz (m3)=−48.0464 dB, and the value of S(3,2) at 4.1 GHz (m5)=−47.8034 dB, whereas the value of S(4,1) at 3.1 GHz (m2)=−61.0372 dB, the value of S(4,1) at 3.6 GHz (m4)=−75.7062 dB, and the value of S(4,1) at 4.1 GHz (m6)=−61.6343 dB. Thus, at 3.6 GHz, the substantial difference in isolation is 27.6598 dB.

Accordingly, based on the results of FIGS. 9C-9D, if an input power equals 1 W at port P1 with all other ports being passive, then port P3=10^(dB(S31)/10)=0.001084 W, and port P4=10^(dB(41)/10) 2.69e−8 W. In contrast, if an input power equals 1 W at port P2 with all other ports being passive, then P4=10^(dB(32)/10)=0.001096 W, and P3=2.63e−5 W. Thus, the difference in coupling dCOUP=|P3−P4|=|0.001084−0.001096|=1.2e−5 W, and the difference in isolation dISO=|P3−P4|=|2.69e−8−2.63e−5|=2.63e−5 W, with both dCOUP and dISO at the minus 5th power (although the dB numbers of the differences appear much greater). As will be understood by those skilled in the art, a power difference on the order of 1.0e−5 W is not a big deal at a −30 dB level, but can be a very big deal at a −40 dB level and below.

Figure 10A:
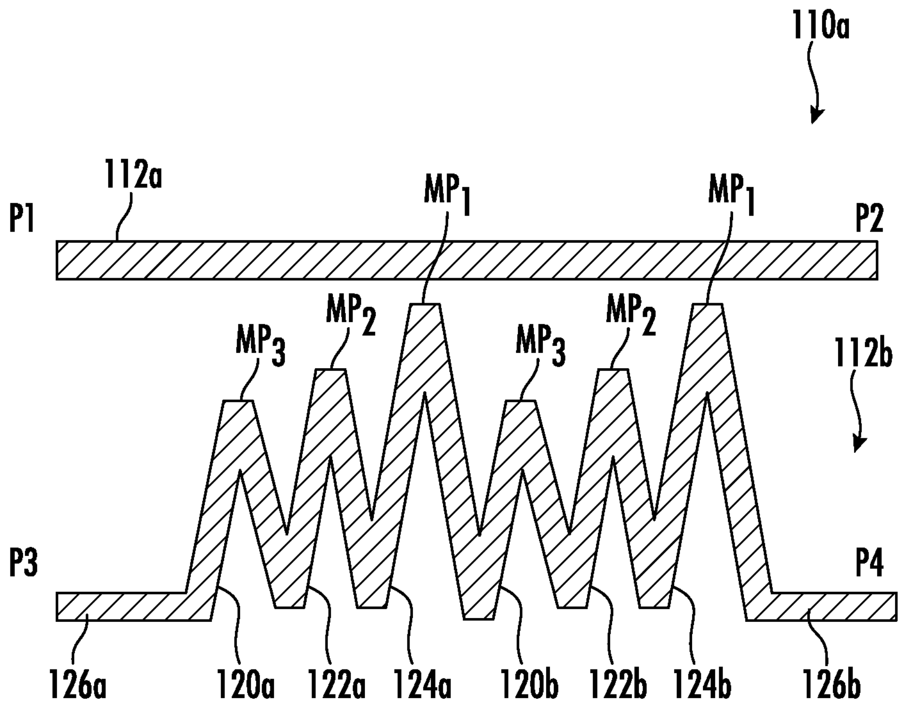
FIG. 10A is a plan layout view of a microstrip directional coupler including a straight primary transmission line and an asymmetric, meander-shaped, secondary transmission line, according to an embodiment of the invention.

Referring now to FIG. 10A, a directional coupler 110*a* according to another embodiment of the invention is illustrated as including a straight primary transmission line 112*a*, which extends between an input port P1 and an output port P2 of the coupler 110*a*, and an asymmetric, meander-shaped, secondary transmission line 112*b*, which extends between a coupling port P3 and an isolation port P4 of the coupler 110*a*. As shown, the secondary transmission line 112*b* includes three (3) pairs of serpentine-shaped (e.g., V-shaped) transmission line segments: (120*a*, 120*b*, short), (122*a*, 122*b*, intermediate), and (124*a*, 124*b*, long), which are patterned to achieve a high coupler directivity resulting from a high degree of coupling asymmetry between the primary transmission line 112*a* and secondary transmission line 112*b*, as described above, and achieve a greater electrical length, which can improve S(3,1), without increasing overall circuit length.

In particular, medial portions $MP_1$ of the long serpentine segments 124*a*, 124*b* are spaced closer to the primary transmission line 112*a* relative to corresponding medial portions $MP_2$ of the intermediate serpentine segments 122*a*, 122*b*, which are spaced closer to the primary transmission line 112*a* relative to corresponding medial portions $MP_3$ of the short serpentine segments 120*a*, 120*b*. According to some embodiments of the invention, and as shown in FIG. 10A, the “short” transmission line segments 120*a*, 120*b* are equivalent (i.e., same metal trace shapes, widths, and overall segment lengths), the “intermediate” transmission line segments 122*a*, 122*b* are equivalent (i.e., same metal trace shapes, widths and, overall segment lengths), and the “long” transmission line segments 124*a*, 124*b* are equivalent (i.e., same metal trace shapes, widths, and overall segment lengths).

As further shown by FIG. 10A, a coupling port segment 126*a* is provided, which is electrically coupled in series between the coupling port P3 and a first, short, serpentine segment 120*a*, whereas an isolation port segment 126*b* is provided, which is electrically coupled in series between a second, long, serpentine segment 124*b* and the isolation port P4. In addition, the first, intermediate, serpentine segment 122*a* is electrically coupled in series between the first, short, serpentine segment 120*a* and a first, long, serpentine segment 124*a*. Finally, a second, short, serpentine segment 120*b* is electrically coupled in series between the first, long, serpentine segment 124*a*, and a second, intermediate, serpentine segment 122*b*, and a second, long, serpentine segment 124*b* is electrically coupled in series between the second, intermediate, serpentine segment 122*b* and the isolation port segment 126*b*.

Figure 10B:
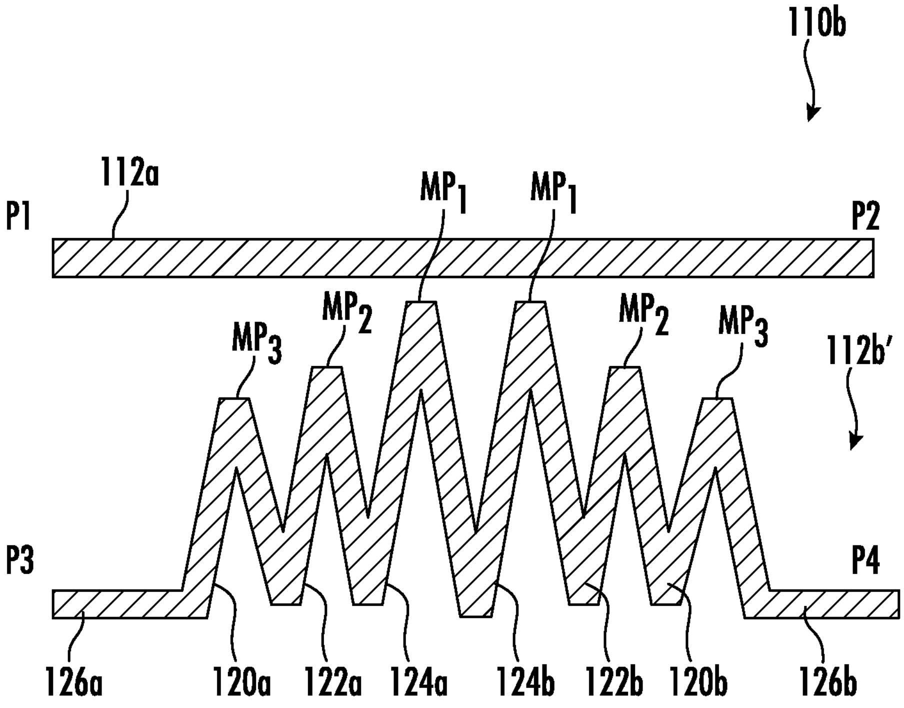
FIG. 10B is a plan layout view of a microstrip directional coupler including a straight primary transmission line and an asymmetric, meander-shaped, secondary transmission line, according to an embodiment of the invention.

Referring now to FIG. 10B, a directional coupler 110*b* according to another embodiment of the invention is illustrated as including a straight primary transmission line 112*a*, which extends between an input port P1 and an output port P2 of the coupler 110*b*, and an asymmetric, meander-shaped, secondary transmission line 112*b*', which extends between a coupling port P3 and an isolation port P4 of the coupler 110*b*. As shown, the secondary transmission line 112*b*' includes three (3) pairs of serpentine-shaped (e.g., V-shaped) transmission line segments: (120*a*, 120*b*, short), (122*a*, 122*b*, intermediate), and (124*a*, 124*b*, long), which are patterned to achieve a high coupler directivity resulting from a high degree of coupling asymmetry between the primary transmission line 112*a* and the secondary transmission line 112*b*'. In particular, medial portions $MP_1$ of the longest serpentine segments 124*a*, 124*b* are spaced closer to the primary transmission line 112*a* relative to corresponding medial portions $MP_2$ of the intermediate serpentine segments 122*a*, 122*b*, which are spaced closer to the primary transmission line 112*a* relative to corresponding medial portions $MP_3$ of the shortest serpentine segments 120*a*, 120*b*.

As further shown by FIG. 10B, a coupling port segment 126*a* is provided, which is electrically coupled in series between the coupling port P3 and a first, short, serpentine segment 120*a*, and an isolation port segment 126*b* is provided, which is electrically coupled in series between a second, short, serpentine segment 120*b* and the isolation port P4. In addition, the first, intermediate, serpentine segment 122*a* is electrically coupled in series between the first, short, serpentine segment 120*a* and a first, long, serpentine segment 124*a*. Finally, a second, long, serpentine segment 124*b* is electrically coupled in series between the first, long, serpentine segment 124*a*, and a second, intermediate, serpentine segment 122*b*, and the second, short, serpentine segment 120*b* is electrically coupled in series between the second, intermediate, serpentine segment 122*b* and the isolation port segment 126*b*. This embodiment of FIG. 10B may also be modified by swapping locations of the serpentine segments 120*a* and 124*a*, and swapping locations of the serpentine segments 120*b* and 124*b*.

Figure 10C:
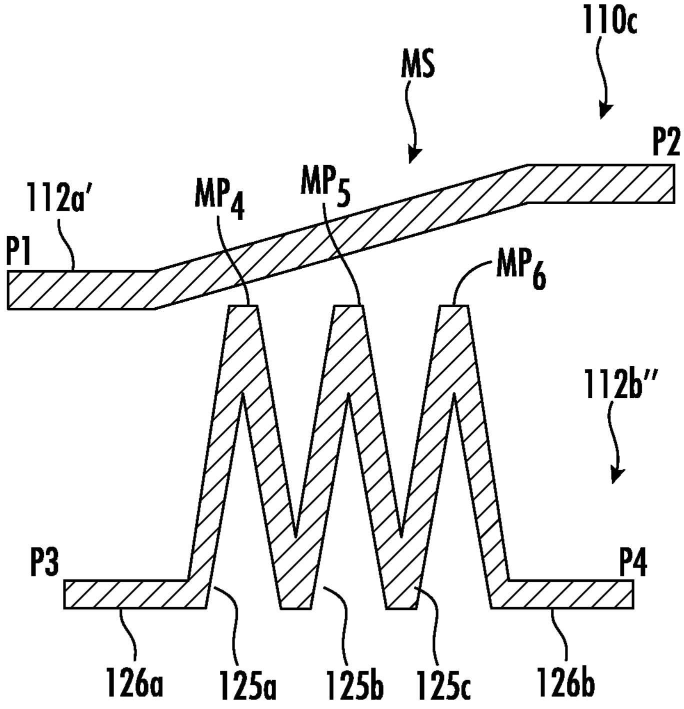
FIG. 10C is a plan layout view of a microstrip directional coupler including a sloped primary transmission line, and a meander-shaped secondary transmission line having equivalent serpentine segments, according to an embodiment of the invention.

Referring now to FIG. 10C, a directional coupler 110*c* according to another embodiment of the invention is illustrated as including a primary transmission line 112*a*' (with a medial segment MS), which extends between an input port P1 and an output port P2 of the coupler 110*c*, and a meander-shaped, secondary transmission line 112*b*", which extends between a coupling port P3 and an isolation port P4 of the coupler 110*c*. As shown, the secondary transmission line 112*b*" includes first, second and third equivalent serpentine-shaped transmission line segments 125*a*, 125*b*, and 125*c*, which means they have the same metal trace shapes and same overall metal trace widths and lengths.

Nonetheless, the medial portions $MP_4$-$MP_6$ of the serpentine-shaped transmission line segments 125*a*, 125*b*, and 125*c* are spaced at different distances relative to the medial segment MS of the primary transmission line 112*a*' because the medial segment MS is sloped at an angle relative to the medial portions $MP_4$-$MP_6$ of the first, second and third serpentine-shaped transmission line segments 125*a*, 125*b* and 125*c*, such that the medial portion $MP_4$ of the first serpentine-shaped transmission line segment 125*a* is spaced closer to the medial segment MS of the primary transmission line 112*a*' relative to the medial portion $MP_5$ of the second serpentine-shaped transmission line segment 125*b*, which is spaced closer to the medial segment MS of the primary transmission line 112*a*' relative to the medial portion $MP_6$ of the third serpentine-shaped transmission line segment 125*c*.

Figure 11A:
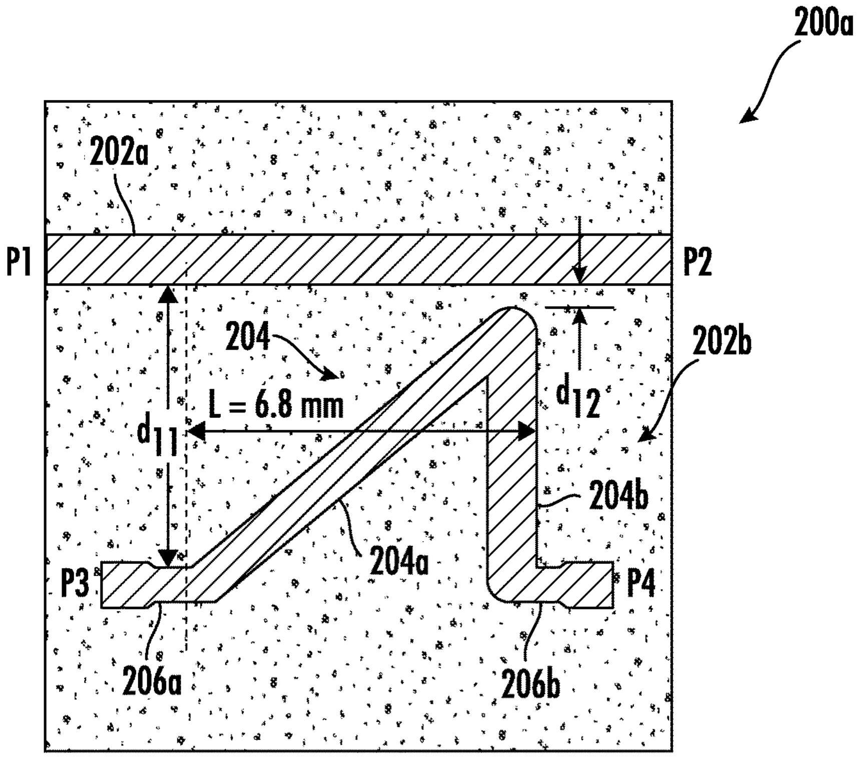
FIG. 11A is a plan layout view of a microstrip directional coupler including a straight primary transmission line, and a slanted secondary transmission line, according to an embodiment of the invention.

Referring now to FIG. 11A, a directional coupler 200*a* according to an additional embodiment of the invention is illustrated as including a straight primary transmission line 202*a*, which extends between an input port P1 and an output port P2 of the coupler 200*a*, and an asymmetric secondary transmission line 202*b*, which extends between a coupling port P3 and an isolation port P4 of the coupler 200*a*. As shown, the secondary transmission line 202*b* includes a straight slanted segment 204*a* and a return segment 204*b*, which collectively define a sawtooth shaped metal trace 204 having a "coupled" length L (e.g., L=6.8 mm). The sawtooth shaped metal trace 204 is electrically coupled at a first end thereof to a short coupling port segment 206*a*, and at a second end thereof to a short isolation port segment 206*b*. In addition, to achieve a high degree of coupling asymmetry along a length of the primary transmission line 202*a*, a first end of the sawtooth shaped metal trace 204 is spaced at a first distance $d_{11}$ from the primary transmission line 202*a* (adjacent the input port), and a junction between the slanted segment 204*a* and the return segment 204*b* is spaced at a second distance $d_{12}$ from the primary transmission line 202*a* (adjacent the output port), where $d_{12} \ll d_{11}$. In addition, both the straight primary transmission line 202*a* and asymmetric secondary transmission line 202*b* may be configured as non-homogenous transmission lines, which can be defined as microstrip lines and strip lines in a non-homogenous medium.

Figure 11B:
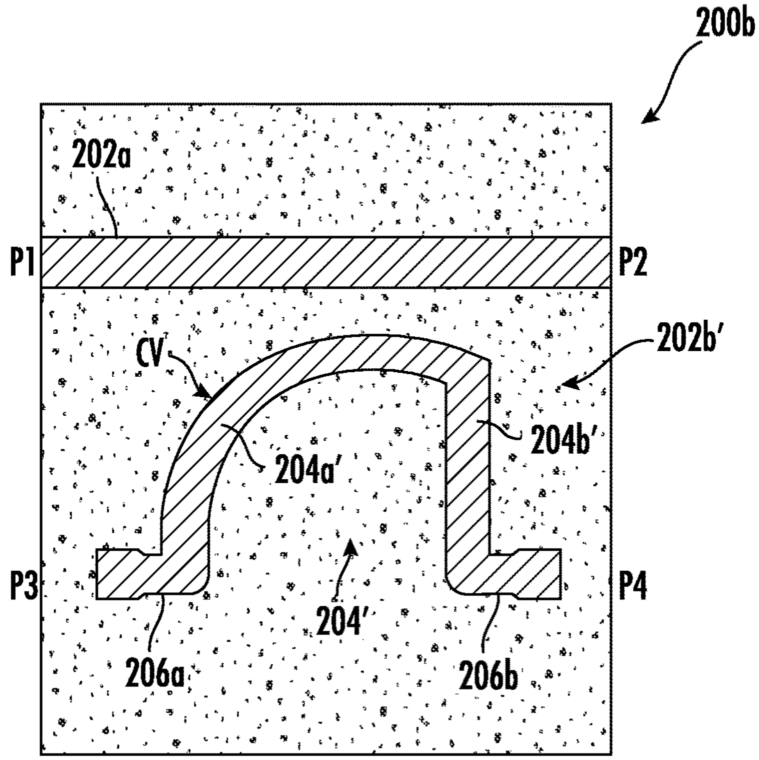
FIG. 11B is a plan layout view of a microstrip directional coupler including a straight primary transmission line and an arcuate-shaped secondary transmission line with a convex edge adjacent the primary transmission line, according to an embodiment of the invention.
Figure 11C:
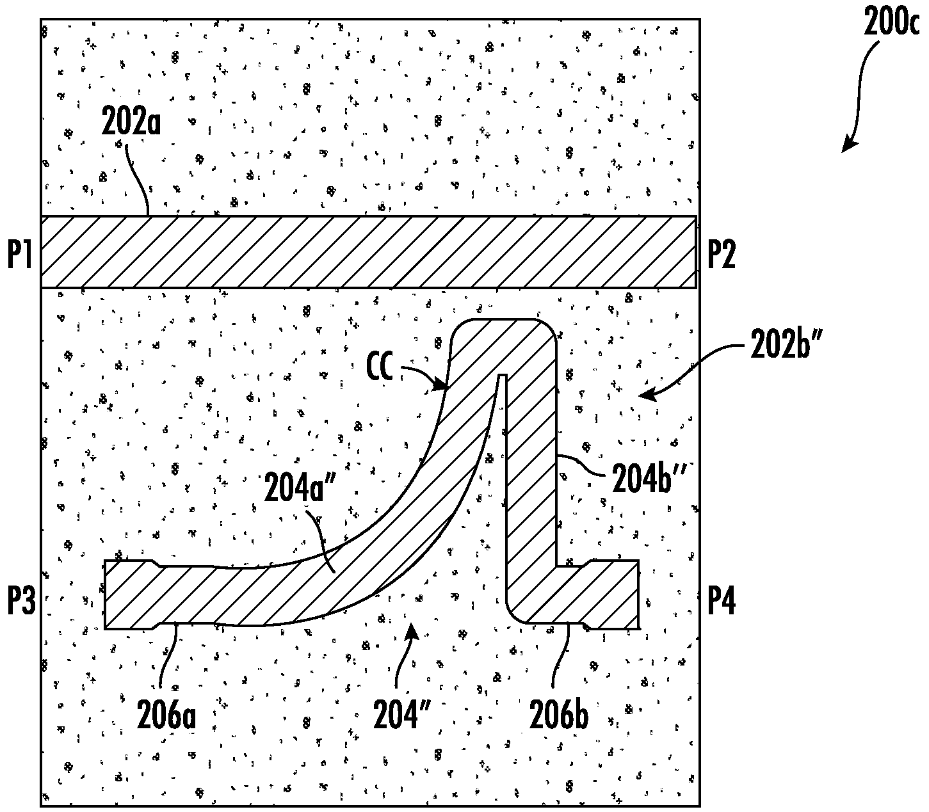
FIG. 11C is a plan layout view of a microstrip directional coupler including a straight primary transmission line and an arcuate-shaped secondary transmission line with a concave edge adjacent the primary transmission line, according to an embodiment of the invention.

Referring now to FIG. 11B, a directional coupler 200*b* according to another embodiment of the invention is illustrated as including a straight primary transmission line 202*a*, which extends between an input port P1 and an output port P2 of the coupler 200*a*, and an asymmetric secondary transmission line 202*b*', which extends between a coupling port P3 and an isolation port P4 of the coupler 200*b*. As shown, the secondary transmission line 202*b*' includes a modified sawtooth shaped metal trace 204' consisting of an arcuate-shaped segment 204*a*' having a convex-shaped edge CV, which extends opposite the primary transmission line 202*a*, and a return segment 204*b*'. This modified sawtooth shaped metal trace 204' is electrically coupled at a first end thereof to a short coupling port segment 206*a*, and at a second end thereof to a short isolation port segment 206*b*. As with the sawtooth shaped metal trace 204 of FIG. 11A, the modified sawtooth shaped metal trace 204' provides a high degree of coupling asymmetry along a length of the primary transmission line 202*a*. Similarly, in FIG. 11C, a directional coupler 200*c* is illustrated as including a straight primary transmission line 202*a*, which extends between an input port P1 and an output port P2 of the coupler 200*a*, and an asymmetric secondary transmission line 202*b*", which extends between a coupling port P3 and an isolation port P4 of the coupler 200*b*. As shown, the secondary transmission line 202*b*" includes a reverse sawtooth shaped metal trace 204" consisting of an arcuate-shaped segment 204*a*" having a concave-shaped edge CC, which extends opposite the primary transmission line 202*a*, and a return segment 204*b*". This reverse sawtooth shaped metal trace 204" is electrically coupled at a first end thereof to a short coupling port segment 206*a*, and at a second end thereof to a short isolation port segment 206*b*. As with the sawtooth shaped metal traces 204, 204' of FIGS. 11A-11B, the reverse sawtooth shaped metal trace 204" provides a high degree of coupling asymmetry along a length of the primary transmission line 202*a*.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A directional coupler, comprising:

a primary transmission line electrically coupled in series between an input port and an output port of the coupler;

an asymmetric, meander-shaped, secondary transmission line, which is electrically coupled in series between a coupling port and an isolation port of the coupler, and comprises:

a first coupling segment, which is reactively coupled to a first portion of the primary transmission line;

a second coupling segment, which is reactively coupled to a second portion of the primary transmission line, and is spaced closer to, or farther from, the primary transmission line relative to the first coupling segment, such that an asymmetry in reactive coupling is present between the first and second portions of the primary transmission line and the asymmetric meander-shaped transmission line;

an intermediate segment electrically coupled in series between the first and second coupling segments;

a coupling port segment electrically connected in series between the first coupling segment and the coupling port; and an isolation port segment electrically connected in series between the second coupling segment and the isolation port; and wherein the asymmetric, meander-shaped, secondary transmission line winds sinuously such that each segment therein extends at least partially in a forward direction across the coupler as measured from the coupling port to the isolation port, and no segment therein extends at least partially in a reverse direction across the coupler as measured from the isolation port to the coupling port.

2. The directional coupler of claim 1, wherein a medial portion of the intermediate segment is spaced farther from the primary transmission line relative to the first and second coupling segments.

3. The directional coupler of claim 2, wherein the intermediate segment is U-shaped or V-shaped.

4. The directional coupler of claim 1, wherein the asymmetric, meander-shaped, secondary transmission line includes at least two serpentine-shaped transmission line segments electrically coupled in series between the coupling port and the isolation port.

5. The directional coupler of claim 1, wherein the asymmetric, meander-shaped, secondary transmission line includes at least three serpentine-shaped transmission line segments electrically coupled in series between the coupling port and the isolation port; and wherein respective medial portions of the first, second and third serpentine line segments are spaced at different distances relative to the primary transmission line.

6. A directional coupler, comprising:

a primary transmission line electrically coupled in series between an input port and an output port of the coupler;

an asymmetric, meander-shaped, secondary transmission line, which is electrically coupled in series between a coupling port and an isolation port of the coupler, and comprises:

a first coupling segment, which is reactively coupled to a first portion of the primary transmission line;

a second coupling segment, which is reactively coupled to a second portion of the primary transmission line, and is spaced closer to, or farther from, the primary transmission line relative to the first coupling segment, such that an asymmetry in reactive coupling is present between the first and second portions of the primary transmission line and the asymmetric meander-shaped transmission line;

an intermediate segment electrically coupled in series between the first and second coupling segments;

a coupling port segment electrically connected in series between the first coupling segment and the coupling port; and an isolation port segment electrically connected in series between the second coupling segment and the isolation port; and wherein the first coupling segment, the second coupling segment and the intermediate segment extend within a combination of a first pair of equivalent serpentine-shaped transmission line segments, and a second pair of equivalent serpentine-shaped transmission line segments, which are longer than the first pair of equivalent serpentine-shaped transmission line segments.

7. The directional coupler of claim 6, wherein one of the second pair of equivalent serpentine-shaped transmission line segments extends, in series, between the first pair of equivalent serpentine-shaped transmission line segments.

8. The directional coupler of claim 7, wherein the second pair of equivalent serpentine-shaped transmission line segments extend, in series, between the first pair of equivalent serpentine-shaped transmission line segments.

9. The directional coupler of claim 6, wherein the asymmetric, meander-shaped, secondary transmission line further includes:

a third pair of equivalent serpentine-shaped transmission line segments, which are longer than the second pair of equivalent serpentine-shaped transmission line segments.

10. The directional coupler of claim 9, wherein one of the second pair of equivalent serpentine-shaped transmission line segments extends, in series, between the first pair of equivalent serpentine-shaped transmission line segments; and wherein one of the third pair of equivalent serpentine-shaped transmission line segments extends, in series, between the first pair of equivalent serpentine-shaped transmission line segments.

11. The directional coupler of claim 10, wherein the second pair of equivalent serpentine-shaped transmission line segments extend, in series, between the first pair of equivalent serpentine-shaped transmission line segments; and wherein the third pair of equivalent serpentine-shaped transmission line segments extend, in series, between the second pair of equivalent serpentine-shaped transmission line segments.

12. A directional coupler, comprising:

a primary transmission line electrically coupled in series between an input port and an output port of the coupler; and a secondary transmission line, which is electrically coupled in series between a coupling port and an isolation port of the coupler, and comprises:

at least first, second and third serpentine-shaped transmission line segments electrically connected in series, with each of the first, second and third serpentine-shaped transmission line segments configured to extend at least partially towards the primary transmission line and having respective medial portions spaced at different distances relative to the primary transmission line.

13. The directional coupler of claim 12, wherein the first, second and third serpentine-shaped transmission line segments have equivalent dimensions when viewed from a plan perspective.

14. The directional coupler of claim 13, wherein the primary transmission line has a medial segment that is sloped at an angle relative to the first, second and third serpentine-shaped transmission line segments, such that the medial portion of the first serpentine-shaped transmission line segment is spaced closer to the medial segment of the primary transmission line relative to the medial portion of the second serpentine-shaped transmission line segment, which is spaced closer to the medial segment of the primary transmission line relative to the medial portion of the third serpentine-shaped transmission line segment.

15. The directional coupler of claim 14, wherein the first serpentine-shaped transmission line segment extends in series between the coupling port and the second serpentine-shaped transmission line segment; and wherein the third serpentine-shaped transmission line segment extends in series between the second serpentine-shaped transmission line segment and the isolation port.

16. A directional coupler, comprising:

a primary transmission line electrically coupled in series between an input port and an output port of the coupler; and a secondary transmission line, which is electrically coupled in series between a coupling port and an isolation port of the coupler, and comprises:

a first pair of equivalent, serpentine-shaped, transmission line segments; and a second pair of equivalent, serpentine-shaped, transmission line segments, which are longer than the serpentine-shaped transmission line segments within the first pair thereof.

17. The directional coupler of claim 16, wherein a first one of the first pair of serpentine-shaped transmission line segments extends in series between the coupling port and the second pair of serpentine-shaped transmission line segments; and wherein a second one of the first pair of serpentine-shaped transmission line segments extends in series between the isolation port and the second pair of serpentine-shaped transmission line segments.

18. The directional coupler of claim 16, wherein a first one of the first pair of serpentine-shaped transmission line segments extends in series between the coupling port and the second pair of serpentine-shaped transmission line segments; and a first one of the second pair of serpentine-shaped transmission line segments extends in series between the isolation port and the first pair of serpentine-shaped transmission line segments.

* * * * *